United States Patent
Chih et al.

(10) Patent No.: US 7,525,796 B2
(45) Date of Patent: Apr. 28, 2009

(54) STORAGE DEVICE

(75) Inventors: Yung-Hung Chih, Shuh-Lin (TW);
Szu-Song Chen, Keelung (TW);
Yi-Chieh Chang, Taipei (TW);
Yun-Tung Lai, Jhonghe (TW)

(73) Assignee: Foreshot Industrial Corporation, Taoyuan County (TW)

( * ) Notice: Subject to any disclaimer, the term of this patent is extended or adjusted under 35 U.S.C. 154(b) by 320 days.

(21) Appl. No.: 11/605,427

(22) Filed: Nov. 29, 2006

(65) Prior Publication Data

US 2008/0123279 A1    May 29, 2008

(51) Int. Cl.
*G06F 1/16* (2006.01)

(52) U.S. Cl. ...................................... 361/685

(58) Field of Classification Search .................. 361/685
See application file for complete search history.

(56) References Cited

U.S. PATENT DOCUMENTS 4,941,841 A * 7/1990 Darden et al. ............... 361/685
5,277,615 A * 1/1994 Hastings et al. ............. 361/685
5,673,172 A * 9/1997 Hastings et al. ............. 361/685
6,058,016 A * 5/2000 Anderson et al. ........... 361/685
6,317,334 B1 * 11/2001 Abruzzini et al. ........... 361/685
6,442,021 B1 * 8/2002 Bolognia et al. ............ 361/685
6,918,174 B2 * 7/2005 Kim et al. ................ 29/603.04
2005/0122674 A1 * 6/2005 Szolyga et al. .............. 361/685

* cited by examiner

*Primary Examiner*—Lisa Lea-Edmonds
(74) *Attorney, Agent, or Firm*—Troxell Law Office PLLC

(57) ABSTRACT

A storage device includes a housing with an opening at the front end for receiving at least one storage container pushed in which can store a storage element, one end of the storage container being provided with a positioning portion; at least one engaging member being jointed rotatably at the rear end of the housing, one end of each engaging member being provided with a connecting portion for engaging the positioning portion of the storage container pushed into the inner of the housing to fix the storage container, and another end of each engaging member provided with a pushing portion. When users turn the engaging member, the connecting portion releases the positioning portion and then the pushing portion pushes the rear end of the storage container subsequently to eject the storage container outwardly.

6 Claims, 5 Drawing Sheets

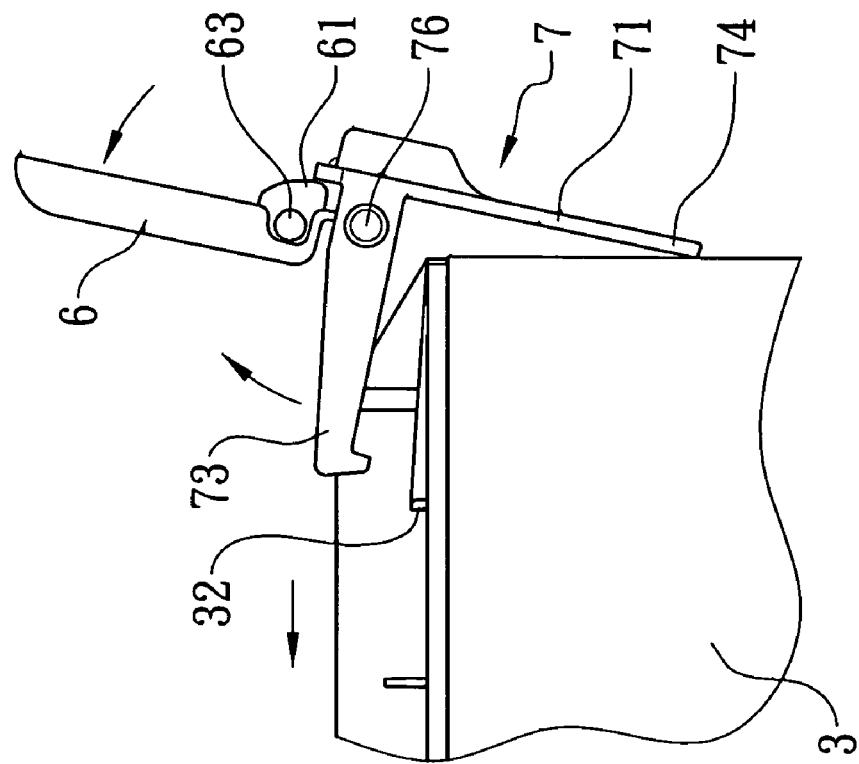
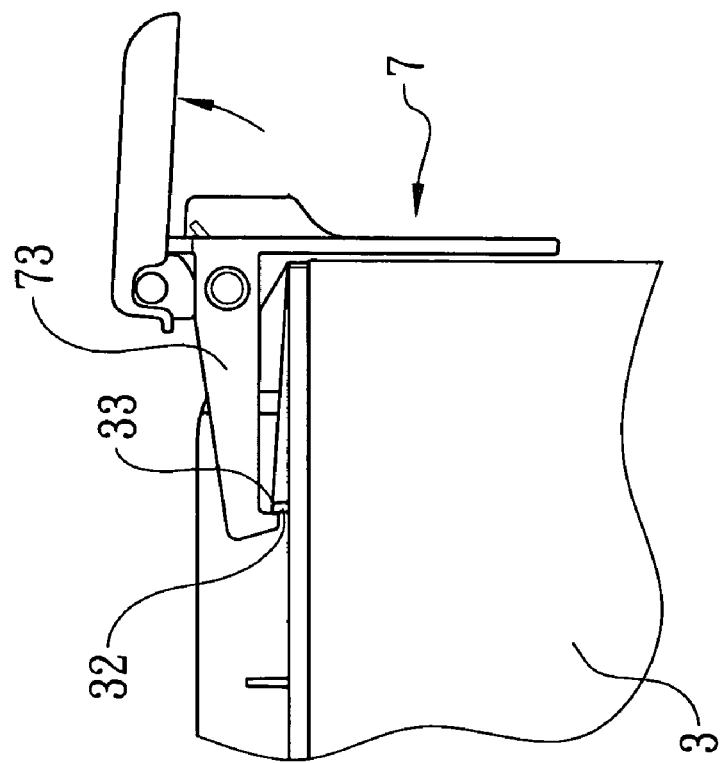
Fig. 6
Fig. 5

STORAGE DEVICE

BACKGROUND OF THE INVENTION

1. Field of the Invention

The present invention is related to a storage device, and particularly to a storage device for fixing or sliding at least a storage container into or out of the inner of a housing by at least one engaging member.

2. Description of the Prior Art

FIG. 7 illustrates a conventional storage structure (a) in prior art. The conventional storage structure (a) includes a housing (a1) and plural storage containers (a2) each of which could store a hard disk therein. The front end of each storage container (a2) is provided with a handle (a3) respectively. When each storage container (a2) is disposed in the housing (a1), each hard disk could be operated by being connected with the computer. Pulling the handle (a3) of each storage container (a2) could eject the storage container (a2) which would be separated from the housing (a1) if the hard disk is not in use.

In accordance with the above structure, it is very convenient for users to have plural hard disks in one computer and carry the hard disks with important data on one's person. However, when the housing receives plural storage containers therein and the storage containers are arranged closely, the handles would interfere with each other easily to result in inconvenience when users pull the storage containers. And the handles are easily broken by excessive force of users.

In view of this, in order to improve the above-stated disadvantages to have the storage device fix the storage container firmly and push each storage container out easily without interference, the inventor had the motive to try and develop the present invention after hard study.

SUMMARY OF THE INVENTION

The primary object of the present invention is to provide a storage device having a storage container with a positioning portion and an engaging member attached at the rear of the housing to position the storage container in the inner of the housing. When a storage element of the storage container is not in use, users could push at the rear end of the housing and take out the storage container easily.

To achieve the above objects, the storage device according to the present invention includes a housing, at least a storage container and at least an engaging member. The front end of the housing is provided with an opening for receiving at least one storage container pushed therein. Each storage containers could store a storage element and have a positioning portion at one end. The engaging members are jointed at the rear end of the housing rotatably. One end of each engaging member is provided with a connecting portion for engaging the positioning portion at the end of the storage container and fixing the storage container in the housing. Another end of each engaging member is provided with a pushing portion for pushing the rear end of the storage container and ejecting the storage container outwardly from the inner of the housing.

BRIEF DESCRIPTION OF THE DRAWINGS

FIG. 5 is a using state diagram in accordance with the present invention;

FIG. 6 is a using state diagram in accordance with the present invention; and

DETAILED DESCRIPTION OF THE PREFERRED EMBODIMENT

Figure 1:
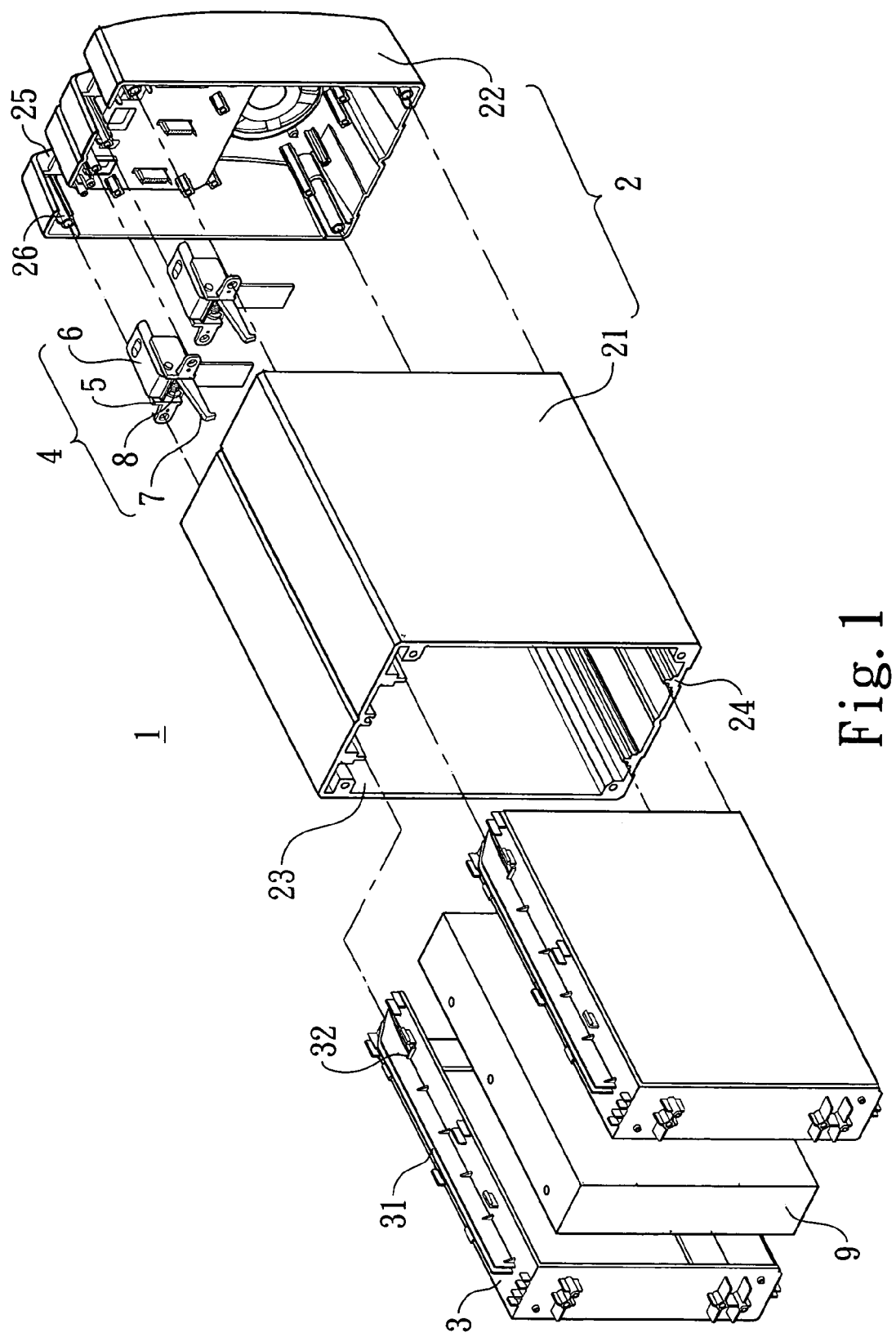
FIG. 1 is an exploded perspective view showing an embodiment of the present invention.
Figure 2:
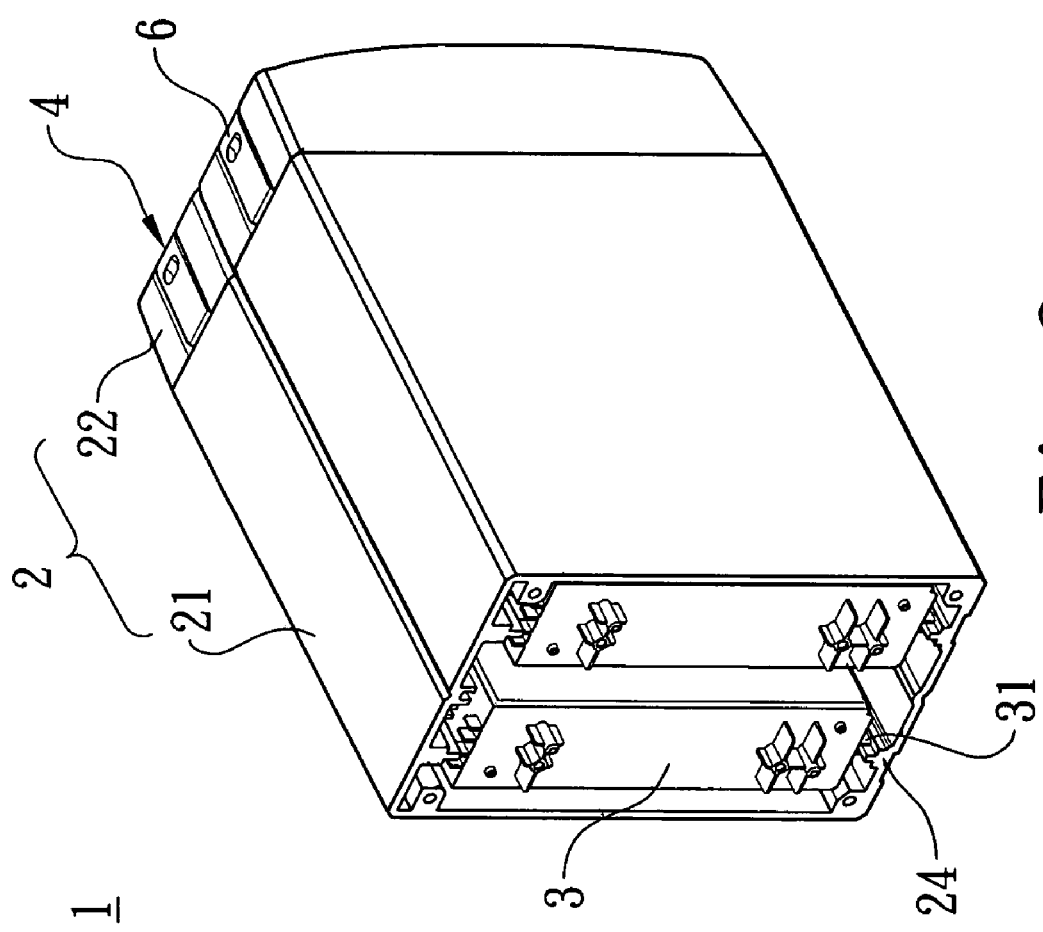
FIG. 2 is a perspective view showing the embodiment of the present invention.

Referring to FIGS. 1 and 2, they illustrate a storage device 1 of a preferred embodiment in accordance with the present invention. The storage device 1 comprises a housing 2, a plurality of storage containers 3 and a plurality of engaging members 4.

The housing 2 is similar to a cuboid and comprises a front body 21 and a rear body 22 connected with each other. The front body 21 is provided with an opening 23 at the front end and two sets of corresponding upper and lower tracks 24 opposite at the inner. The upper end of the rear body 22 is provided with two notches 25. A pair of fixing rods 26 with internal screw-thread are provided on two sides of each notch 25.

Figure 4:
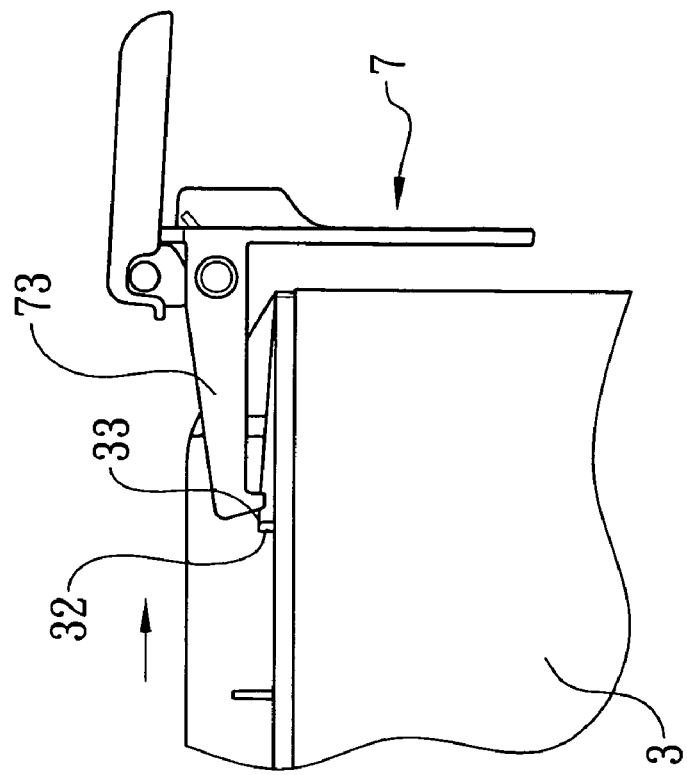
FIG. 4 is a using state diagram in accordance with the present invention.

The storage container 3 is similar to a cuboid and has a hollow inner for storing a hard disk. The hard disk is referred to as a storage element 9. Upper and lower ends of the storage container 3 are respectively provided with a longitudinal rail 31 for fitting the corresponding upper and lower tracks 24 opposite in the front body 21 to slide the storage container 3 into or out of the inner of the housing 2. One side of the longitudinal rail 31 upon the storage container 3 is provided with a projection. On the rear end of the projection is provided with a curved face 33 (as shown in FIG. 4). The projection is used as a positioning portion 32 and also could be provided with an oblique face on its rear end.

Figure 3:
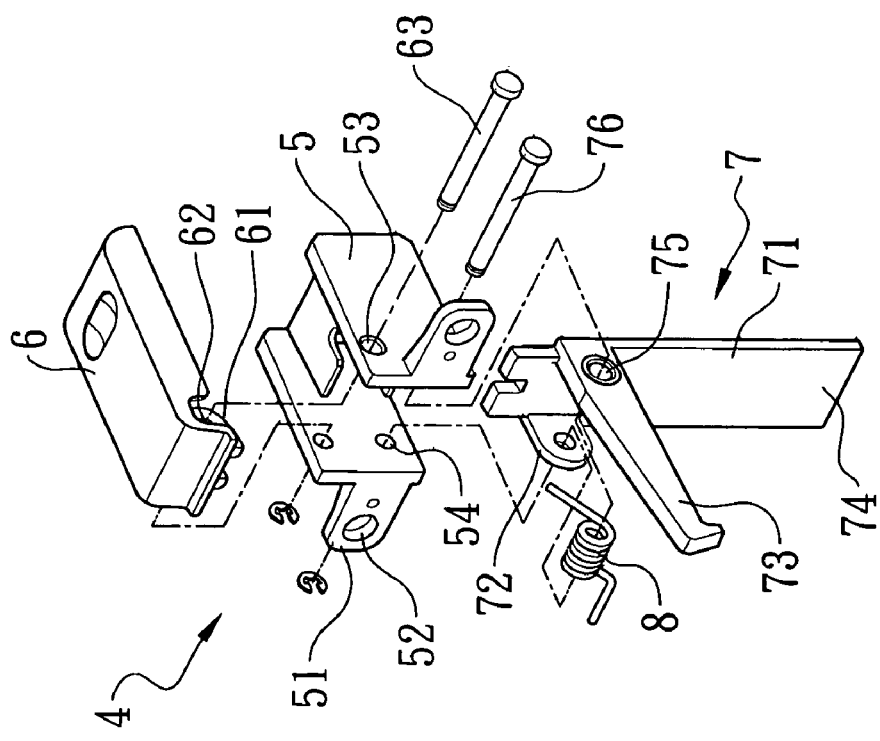
FIG. 3 is an exploded perspective view of an engaging member in accordance with the present invention.
Figure 7:
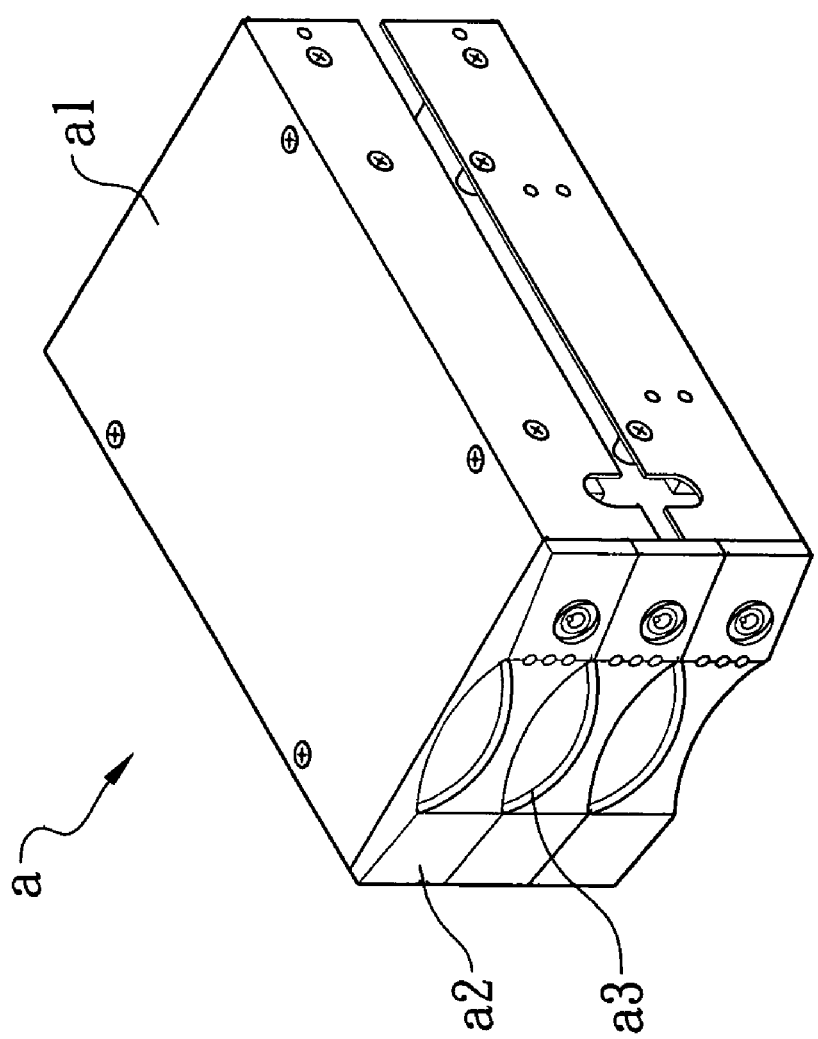
FIG. 7 is a perspective view of a conventional storage structure in prior art.

Referring to FIGS. 1 and 3, the engaging member 4 is arranged in the notch 25 of the rear body 22 of the housing 2 and comprises a fixing element 5, a turning element 6, a striking element 7 and a spring 8.

The fixing element 5 is composed of plural sheets and disposed with two tabs 51 respectively on each side of the front end of the fixing element 5. Each tab 51 is provided with an aperture 52 for a screw (not shown in figures) passing through and fixing on the fixing rod 26 of the notch 25 of the rear body 22. The fixing element 5 is disposed with an upper bore 53 and a lower bore 54 which are placed transversely.

The turning element 6 is similar to a long board and disposed with a striking portion 61 with a curved rim under the front end. The plane of the striking portion 61 is provided with a hole 62 for a first shaft rod 63 passing through the hole 62 and the upper bore 53 of the fixing element 5. Thus, the striking portion 61 is jointed with the fixing element 5 rotatably.

The striking element 7 is composed of plural sheets and mainly comprises a standing board 71, a projecting portion 72 extending perpendicularly from two opposite sides of the upper end of the standing board 71 and a hook-shaped connecting portion 73. The upper end of the standing board 71 is contacted with the striking portion 61 of the turning element 6 and the lower end is designed as a pushing portion 74. The pushing portion 74 and the connecting portion 73 form a reverse "L" shape. The plane of the projecting portion 72 and the connecting portion 73 are provided with a passage 75 respectively for a second shaft rod 76 passing through. Thus, the striking element 7 is jointed with the fixing element 5 rotatably. And the spring 8 is arranged to act on the second shaft rod 76.

FIG. 4 illustrates the structure of the present invention in use. Wherein, when the user slides the storage container 3 into the inner of the housing 2, the positioning portion 32 of the upper end of the storage container 3 is contacted with the front end of the connecting portion 73 of the striking element 7. And the front end of the connecting portion 73 moves along the curved face 33 on the rear end of the positioning portion 32 upwardly. When the storage container 3 enters the inner of the housing 2 deeply, the front end of the connecting portion 73 holds the positioning portion 32 to fix the storage container 3 (as shown in FIG. 5). When the user turns the rear end of the turning element 6, the turning element 6 revolves around the first shaft rod 63 in a counterclockwise direction. Then the curved rim of the striking portion 61 of the turning element 6 presses and pushes the upper end of the standing board 71 of the striking element 7. The striking element 7 is driven subsequently and revolves around the second shaft rod 76 in a clockwise direction and the front end of the connecting portion 73 of the striking element 7 releases the positioning portion 32 of the storage container 3. Meanwhile, the pushing portion 74 of the striking element 7 pushes the rear end of the storage container 3 to eject the storage container 3 outwardly from the inner of the housing 2.

Therefore, the present invention has the following advantages:

1. The present invention could fix the storage container in the inner of the housing without detaching outwardly by the match of the engaging member and the positioning portion.
2. It is convenient in operation to release the storage container and push the rear end of the storage container at the same time to take out the storage container by the structure of the present invention.

As stated in the above disclosure, the present invention can surely achieve its expected objects to provide a storage device for fixing the storage container and ejecting the storage container easily.

While the invention has been described with reference to certain embodiments, it will be understood by those skilled in the art that various changes may be made and equivalents may be substituted without departing from the scope of the present invention.

The invention claimed is:

1. A storage device comprising:
   a housing having an opening at the front end;
   at least a storage container received in the inner of the housing for storing a storage element, and the storage container having a positioning portion on one end; and
   at least an engaging member jointed rotatably at the rear end of the housing, one end of each engaging member having a connecting portion for engaging the positioning portion of the storage container and mounting the storage container in the inner of the housing, another end of each engaging member provided with a pushing portion for pushing the rear end of the storage container and ejecting the storage container outwardly from the inner of the housing.

2. The storage device as claimed in claim 1, wherein the housing comprises a front body and a rear body.

3. The storage device as claimed in claim 1, wherein the inner of the housing is provided with a plurality of tracks and each storage container is provided with at least a rail for fitting the track to slide the storage container into or out of the inner of the housing.

4. The storage device as claimed in claim 1, wherein the positioning portion of the storage container is a projection.

5. The storage device as claimed in claim 1, wherein the storage element is a hard disk.

6. The storage device as claimed in claim 1, wherein the engaging member comprises a fixing element, a turning element, a striking element and a spring, the fixing element being mounted on the rear end of the housing, the turning element being jointed on the fixing element rotatably and having a striking portion on the lower end, the striking element being jointed on the fixing element rotatably and contacting the striking portion by its upper end, the lower end of the striking element being designed as a pushing portion, the pushing portion and the connecting portion forming a reverse "L" shape, the spring being arranged to act on a second rod for rotating the striking element.

* * * * *